United States Patent
Asver et al.

(10) Patent No.: US 9,509,732 B2
(45) Date of Patent: Nov. 29, 2016

(54) SYSTEM AND METHOD FOR HOSTING AND SHARING A LIVE EVENT

(71) Applicant: Google Inc., Mountain View, CA (US)

(72) Inventors: Ajmal Asver, San Francisco, CA (US); Matthew Eric Waddell, Palo Alto, CA (US); Matthew Steiner, Los Altos, CA (US); Denise Ho, Los Altos, CA (US); Zachary Yeskel, San Francsico, CA (US); Kavi Harshawat, San Francisco, CA (US); James Gallagher, Sunnyvale, CA (US); Dave Cohen, Mountain View, CA (US); Anton Lopyrev, San Francisco, CA (US); Dobromir Montauk, Redwood City, CA (US)

(73) Assignee: Google Inc., Mountain View, CA (US)

( * ) Notice: Subject to any disclaimer, the term of this patent is extended or adjusted under 35 U.S.C. 154(b) by 433 days.

(21) Appl. No.: 13/731,730

(22) Filed: Dec. 31, 2012

(65) Prior Publication Data
US 2013/0346498 A1  Dec. 26, 2013

Related U.S. Application Data

(60) Provisional application No. 61/664,684, filed on Jun. 26, 2012.

(51) Int. Cl.
*G06F 15/16* (2006.01)
*H04L 29/06* (2006.01)
(Continued)

(52) U.S. Cl.
CPC ......... *H04L 65/403* (2013.01); *G06F 3/04842* (2013.01); *G06F 17/3089* (2013.01);
(Continued)

(58) Field of Classification Search
CPC ...... G06Q 10/10; G06Q 50/01; H04L 29/06; H04L 51/32; H04L 65/403; G06F 17/30867; G06F 3/04842; G06F 17/3089
USPC .................................................. 709/204–205
See application file for complete search history.

(56) References Cited

U.S. PATENT DOCUMENTS

| | | |
|---|---|---|
| 7,752,553 B2 | 7/2010 | Pennington et al. |
| 2008/0215426 A1* | 9/2008 | Guldimann ............ G06Q 30/02 705/14.61 |

(Continued)

FOREIGN PATENT DOCUMENTS

| | | |
|---|---|---|
| JP | 2008-085681 A | 4/2010 |
| JP | 2007-094551 A | 4/2012 |

(Continued)

OTHER PUBLICATIONS

International Search Report, Dated Dec. 16, 2013, for Related PC Application No. PCT/US2013/047787.

(Continued)

*Primary Examiner* — Chris Parry
*Assistant Examiner* — Weiwei Stiltner
(74) *Attorney, Agent, or Firm* — IP Spring

(57) ABSTRACT

A computer-implemented method and computing system for generating, using one or more computing devices, an event page corresponding to a particular event, the event page associated with a social network. The method further configured to allow access to the event page to one or more members of the social network and to determine a subset of the one or more members of the social network. The method further configured to provide the subset of the one or more members of the social network with permission to edit the event page and receive real-time updates to the event page from the subset of the one or more members of the social network.

20 Claims, 8 Drawing Sheets

(51) Int. Cl.
  *G06F 17/30*    (2006.01)
  *G06Q 10/10*    (2012.01)
  *G06Q 50/00*    (2012.01)
  *G06F 3/0484*   (2013.01)
  *H04L 12/58*    (2006.01)

(52) U.S. Cl.
  CPC ......... *G06F17/30867* (2013.01); *G06Q 10/10* (2013.01); *G06Q 50/01* (2013.01); *H04L 29/06* (2013.01); *H04L 51/32* (2013.01)

(56) References Cited

U.S. PATENT DOCUMENTS

| | | |
|---|---|---|
| 2009/0222750 A1 | 9/2009 | Jain et al. |
| 2010/0217645 A1* | 8/2010 | Jin et al. ............................ 705/9 |
| 2011/0138210 A1 | 6/2011 | Belali et al. |
| 2011/0154223 A1 | 6/2011 | Whitnah et al. |
| 2011/0258556 A1 | 10/2011 | Kiciman et al. |
| 2011/0276372 A1* | 11/2011 | Spivack et al. ............. 705/14.5 |
| 2011/0289422 A1 | 11/2011 | Spivack et al. |
| 2012/0004956 A1 | 1/2012 | Huston et al. |
| 2012/0124458 A1 | 5/2012 | Cruzada |
| 2012/0136689 A1 | 5/2012 | Ickman et al. |
| 2012/0257112 A1* | 10/2012 | Fritsch .......................... 348/580 |
| 2012/0259842 A1* | 10/2012 | Oman et al. .................. 707/722 |
| 2013/0036369 A1* | 2/2013 | Mitchell ................ G06Q 50/00 715/753 |
| 2013/0097144 A1* | 4/2013 | Siamwalla et al. ........... 707/706 |
| 2013/0166048 A1* | 6/2013 | Werner et al. .................. 700/91 |
| 2013/0311274 A1* | 11/2013 | Ashok et al. ............. 705/14.49 |

FOREIGN PATENT DOCUMENTS

| | | |
|---|---|---|
| JP | 2013-543187 A | 11/2013 |
| WO | 2012061318 A1 | 5/2012 |

OTHER PUBLICATIONS

KIPO's Notice of Preliminary Rejection received for Korean Application No. 10-2015-7001944 (Translation), Sep. 15, 2015. 9 pages.

Japanese Patent Office, Notice of Reasons for Rejection (with English translation) for Japanese Patent Application No. 2015-520422, Feb. 8, 2016, 7 pages.

European Patent Office, Extended European Search Report for European Patent Application No. 13734626.8, Jan. 14, 2016, 8 pages.

* cited by examiner

600

700

SYSTEM AND METHOD FOR HOSTING AND SHARING A LIVE EVENT

CROSS-REFERENCE TO RELATED APPLICATIONS

This application claims the benefit of U.S. Provisional Application having Ser. No. 61/664,684, filed Jun. 26, 2012, of which the entire contents are incorporated herein by reference.

TECHNICAL FIELD

This disclosure relates to event hosting and, more particularly, to a computer-implemented method for real-time event hosting.

BACKGROUND

Large public events are often broadcast using various mediums such as television and the internet. Providing a real-time mechanism by which viewers can see what is happening at the event is often desirable. Allowing too many participants to contribute comments and photos to the event may become burdensome and may result in unwanted comments (e.g. spam, etc.).

SUMMARY OF DISCLOSURE

In a first implementation, a computer-implemented method includes generating, using one or more computing devices, an event page corresponding to a particular event, the event page associated with a social network. The method may also include allowing access to the event page to one or more members of the social network and determining a subset of the one or more members of the social network. The method may further include providing the subset of the one or more members of the social network with permission to edit the event page and receiving real-time updates to the event page from the subset of the one or more members of the social network. The method may also include restricting the one or more members of the social network who are not the subset from editing the event page, wherein editing includes at least one of adding photos, adding videos, and adding comments to the event page.

In another implementation a computer-implemented method may include generating, using one or more computing devices, an event page corresponding to a particular event, the event page associated with a social network and allowing access to the event page to one or more members of the social network. The method may further include determining a subset of the one or more members of the social network and providing the subset of the one or more members of the social network with permission to edit the event page. The method may also include receiving real-time updates to the event page from the subset of the one or more members of the social network.

One or more of the following features may be included. In some embodiments, providing may include providing the subset with permission to add photos to the event page. In some embodiments, providing may include providing the subset with permission to add comments to the event page. In some embodiments, providing may include providing the subset with permission to add videos to the event page. The method may further include restricting the one or more members of the social network who are not the subset from editing the event page. The method may also include allowing at least one of the one or more members to socially annotate at least one aspect of the event page. The method may also include providing an indication to the one or more members of the social network that the event is currently occurring. The method may further include providing the one or more members of the social network with an option to add the event to a calendar.

In another implementation, a computing system includes a processor and memory configured to perform operations including generating, using one or more computing devices, an event page corresponding to a particular event, the event page associated with a social network and allowing access to the event page to one or more members of the social network. Operations may further include determining a subset of the one or more members of the social network and providing the subset of the one or more members of the social network with permission to edit the event page. Operations may also include receiving real-time updates to the event page from the subset of the one or more members of the social network.

One or more of the following features may be included. In some embodiments, providing may include providing the subset with permission to add photos to the event page. In some embodiments, providing may include providing the subset with permission to add comments to the event page. In some embodiments, providing may include providing the subset with permission to add videos to the event page. Operations may further include restricting the one or more members of the social network who are not the subset from editing the event page. Operations may also include allowing at least one of the one or more members to socially annotate at least one aspect of the event page. Operations may also include providing an indication to the one or more members of the social network that the event is currently occurring. Operations may further include providing the one or more members of the social network with an option to add the event to a calendar.

In another implementation a computer program product including a non-transitory computer-readable storage medium having stored thereon instructions, which when executed by a processor result in one or more operations. Operations may include generating, using one or more computing devices, an event page corresponding to a particular event, the event page associated with a social network and allowing access to the event page to one or more members of the social network. Operations may also include determining a subset of the one or more members of the social network and providing the subset of the one or more members of the social network with permission to edit the event page. Operations may further include receiving real-time updates to the event page from the subset of the one or more members of the social network.

In some embodiments, providing may include providing the subset with permission to add photos to the event page. Providing may also include providing the subset with permission to add comments to the event page.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
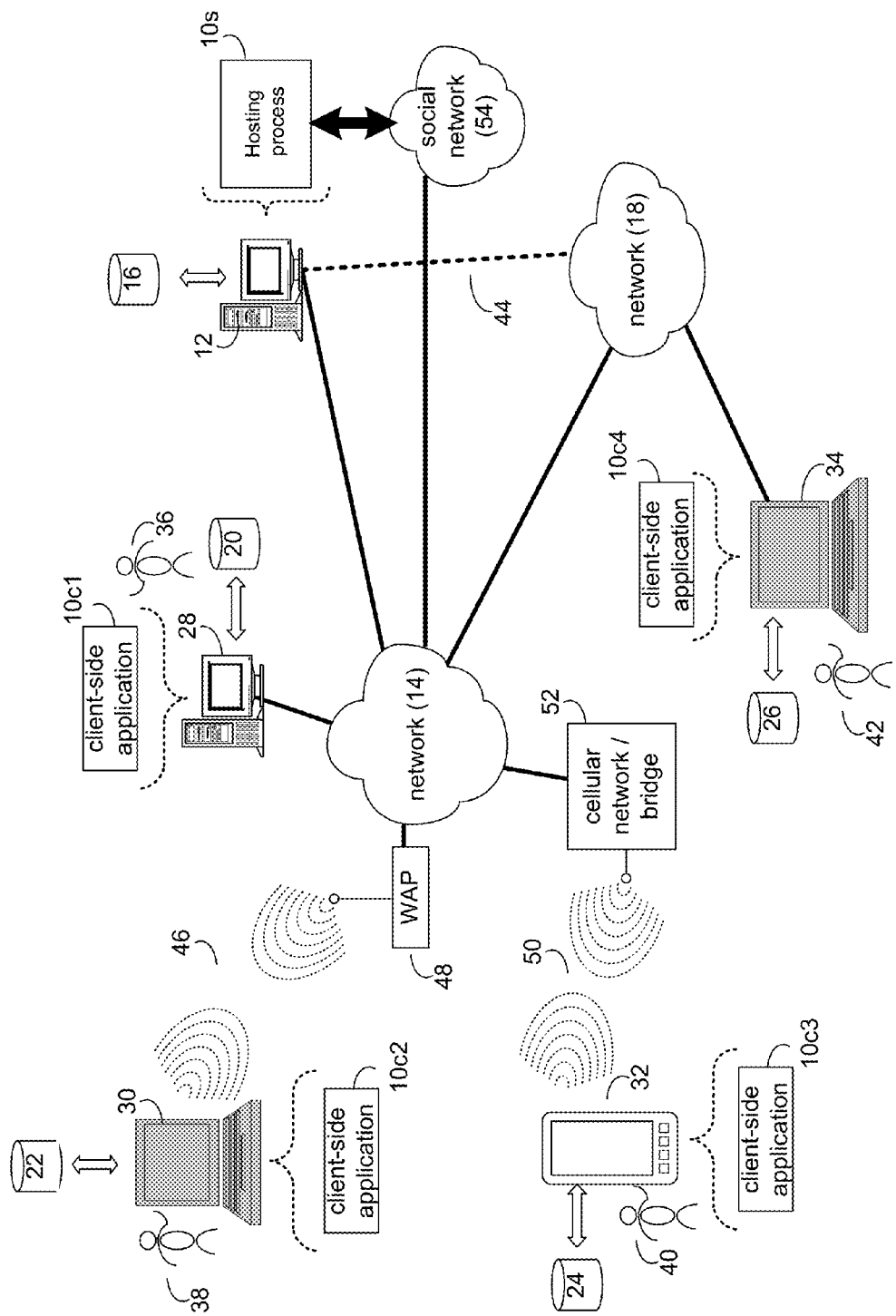
FIG. 1 is a diagrammatic view of a distributed computing network including a computing device that executes a hosting process according to an embodiment of the present disclosure.

Referring to FIG. 1, there is shown hosting process 10. For the following discussion, it is intended to be understood that hosting process 10 may be implemented in a variety of ways. For example, hosting process 10 may be implemented as a server-side process, a client-side process, or a server-side/client-side process. Embodiments of the present disclosure may allow for public consumption of large events, while restricting participation and preventing abuse. For example, public viewers that are not on an invite list may have limited access.

For example, hosting process 10 may be implemented as a purely server-side process via hosting process 10s. Alternatively, hosting process 10 may be implemented as a purely client-side process via one or more of client-side application 10c1, client-side application 10c2, client-side application 10c3, and client-side application 10c4. Alternatively still, hosting process 10 may be implemented as a server-side/client-side process via hosting process 10s in combination with one or more of client-side application 10c1, client-side application 10c2, client-side application 10c3, and client-side application 10c4.

Accordingly, hosting process 10 as used in this disclosure may include any combination of hosting process 10s, client-side application 10c1, client-side application 10c2, client-side application 10c3, and client-side application 10c4.

Figure 2:
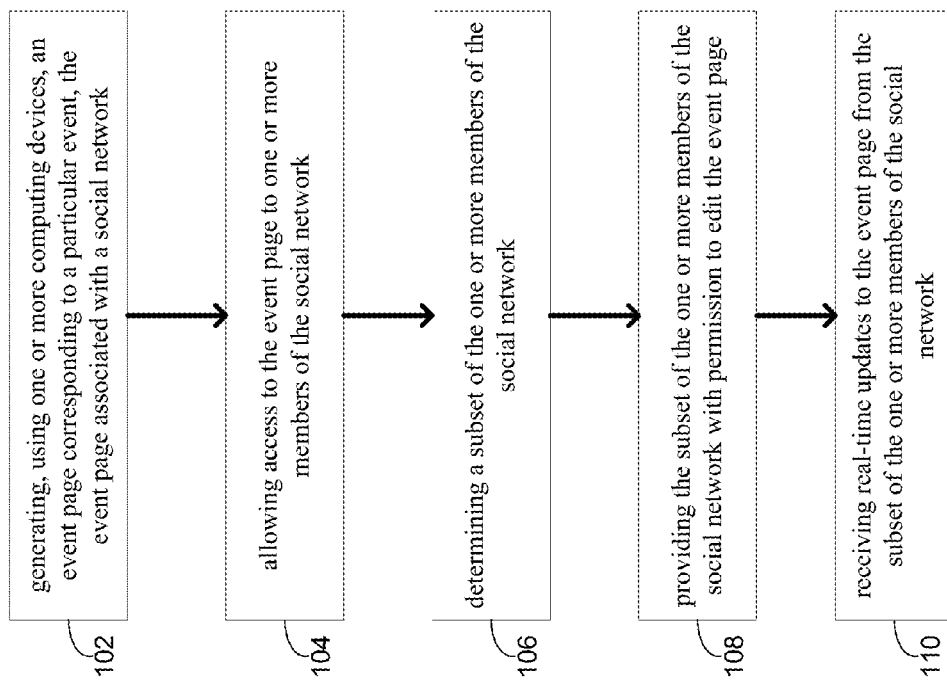
FIG. 2 is a flowchart of operations consistent with the hosting process of the present disclosure.

Referring also to FIG. 2 and as will be discussed below in greater detail, hosting process 10 may include generating (102), using one or more computing devices, an event page corresponding to a particular event, the event page associated with a social network. Hosting process 10 may further include allowing (104) access to the event page to one or more members of the social network and determining (106) a subset of the one or more members of the social network. Hosting process 10 may also include providing (108) the subset of the one or more members of the social network with permission to edit the event page and receiving (110) real-time updates to the event page from the subset of the one or more members of the social network.

Hosting process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of hosting process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to a web browser, a game console user interface, a television user interface, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, desktop computer 28, laptop computer 30, data-enabled, cellular telephone 32, notebook computer 34, a server computer (not shown), a personal gaming device (not shown), a data-enabled television console (not shown), a personal music player (not shown), and a dedicated network device (not shown). Client electronic devices 28, 30, 32, 34 may each execute an operating system, examples of which may include but are not limited to Microsoft Windows™, Android™, WebOS™, iOS™, Redhat Linux™, or a custom operating system.

Users 36, 38, 40, 42 may access hosting process 10 directly through network 14 or through secondary network 18. Further, hosting process 10 may be accessed through secondary network 18 via link line 44.

The various client electronic devices (e.g., client electronic devices 28, 30, 32, 34) may be directly or indirectly coupled to network 14 (or network 18). For example, desktop computer 28 is shown directly coupled to network 14 via a hardwired network connection. Laptop computer 30 is shown wirelessly coupled to network 14 via wireless communication channel 46 established between laptop computer 30 (respectively) and wireless access point (i.e., WAP) 48, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Further, data-enabled, cellular telephone 32 is shown wirelessly coupled to network 14 via wireless communication channel 50 established between data-enabled, cellular telephone 32 and cellular network/bridge 52, which is shown directly coupled to network 14. Additionally, notebook computer 34 is shown directly coupled to network 18 via a hardwired network connection.

Hosting process 10 may be configured to interact with social network 54. An example of social network 54 may include but is not limited to Google+™, Facebook™, etc. Accordingly, hosting process 10 may be configured to be a portion of/included within social network 54. Alternatively, hosting process 10 may be configured to be a stand-alone process that interacts with (via e.g., an API) social network 54. Social network 54 may be configured to allow users (e.g., users 36, 38, 40, 42) to communicate with and/or control one or more robots (e.g. robot 56) via social network 54.

As discussed above and referring also to FIGS. 2-4, hosting process 10 consistent with embodiments of the present disclosure may allow the ability to create "on-air events". For example, in some embodiments hosting process 10 may be associated with one or more social networking websites. As is discussed in further detail below, these "on-air events" may refer to a special type of event such that they are viewable by the public but only invitees can add photos and comments.

Figure 3:
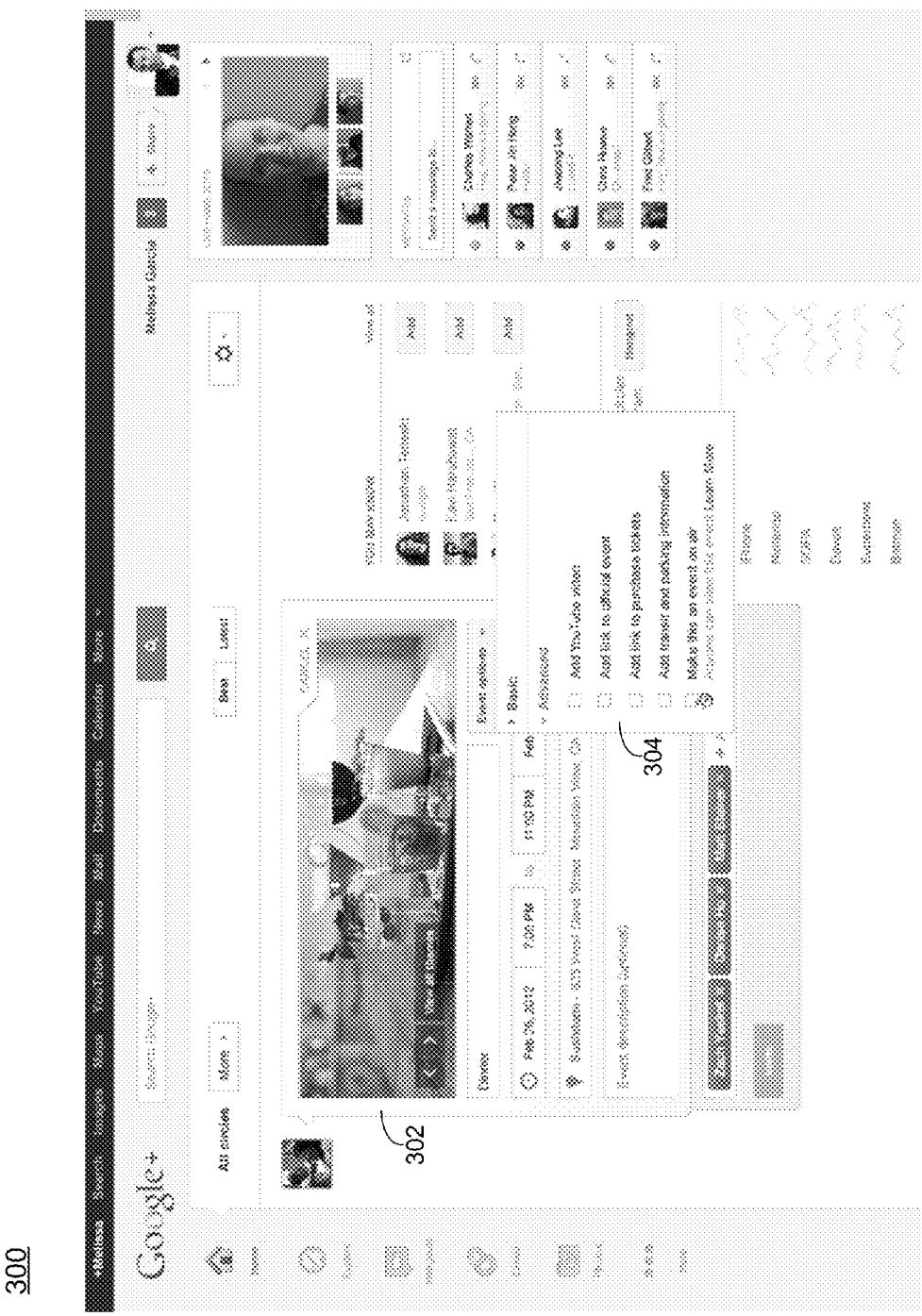
FIG. 3 is a diagrammatic view of an interface consistent with the hosting process of FIG. 1.
Figure 4:
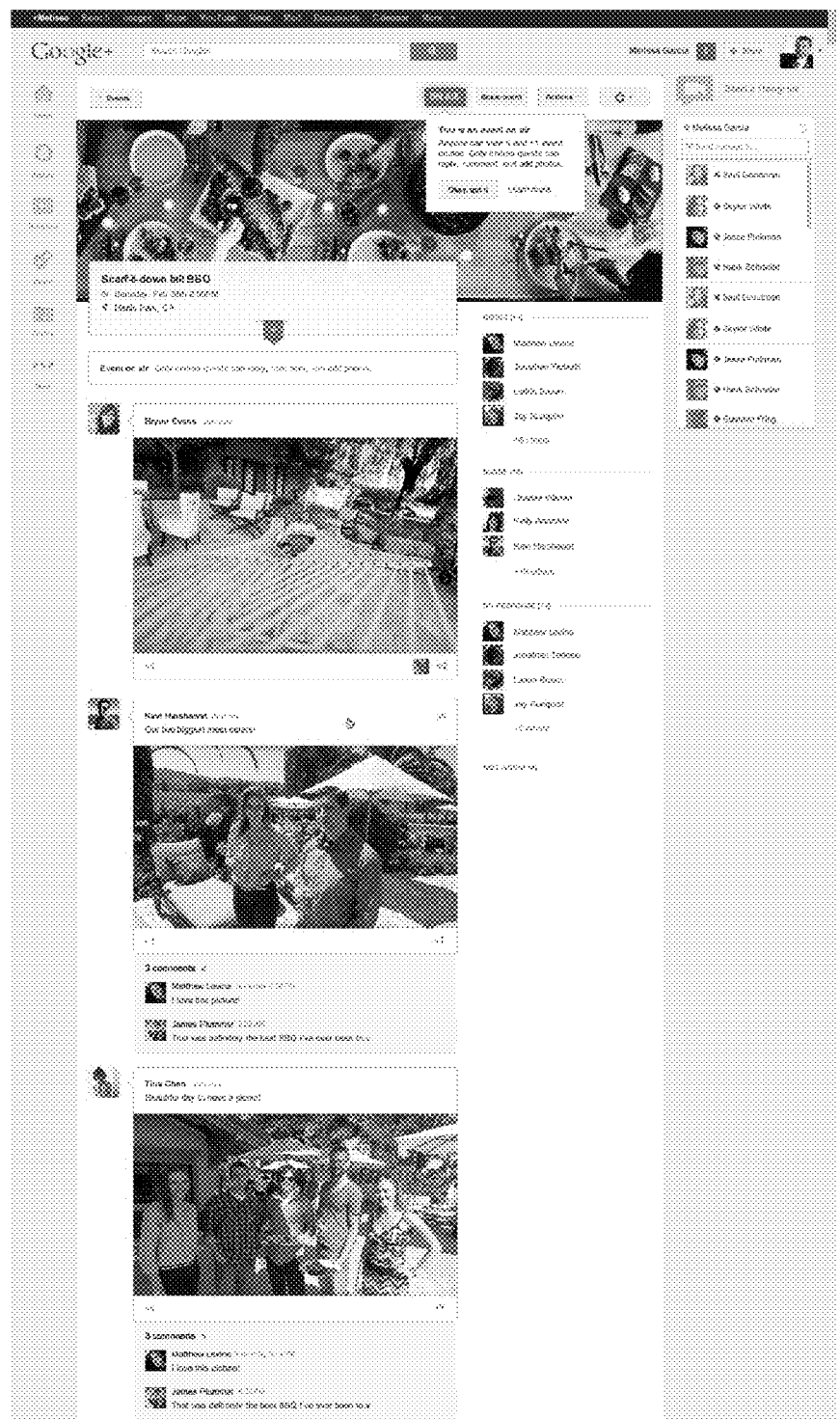
FIG. 4 is a diagrammatic view of an interface consistent with the hosting process of FIG. 1.
Figure 5:
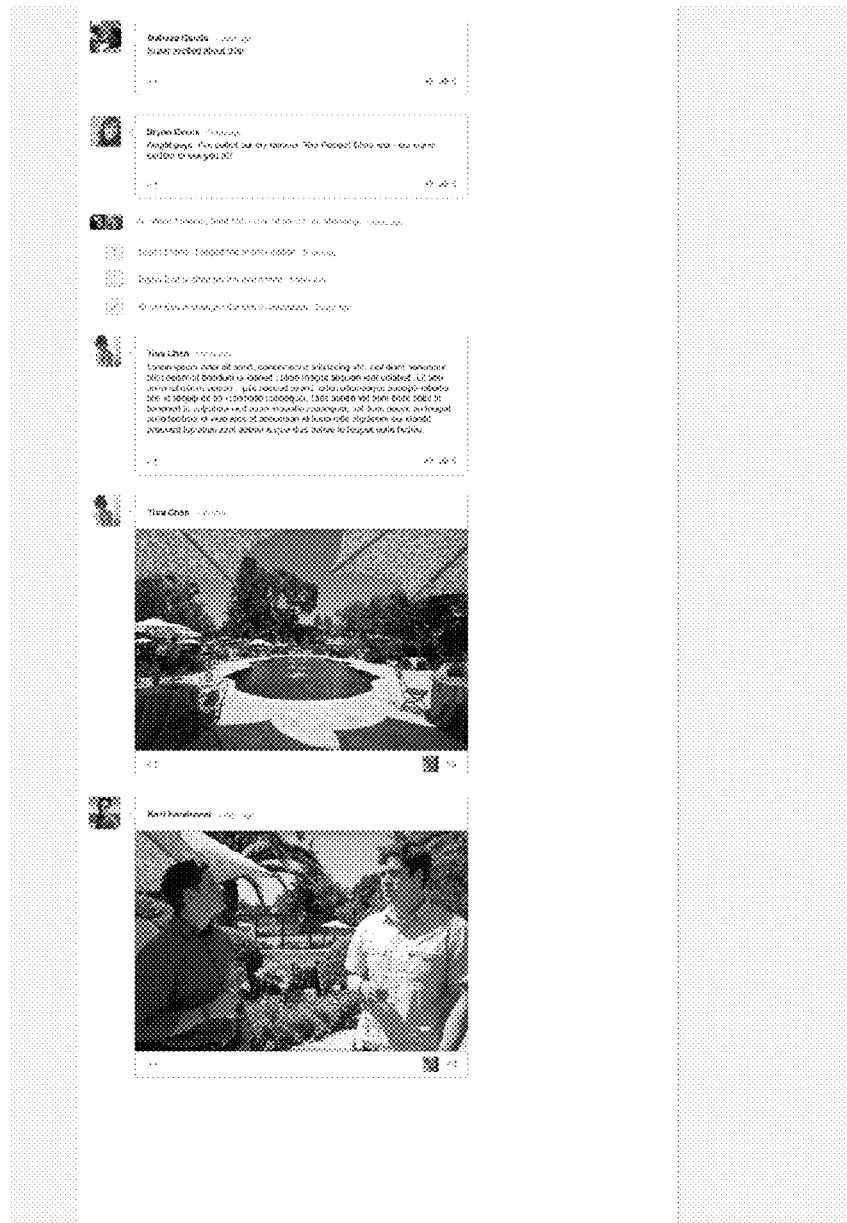
FIG. 5 is a diagrammatic view of an interface consistent with the hosting process of FIG. 1.
Figure 6:
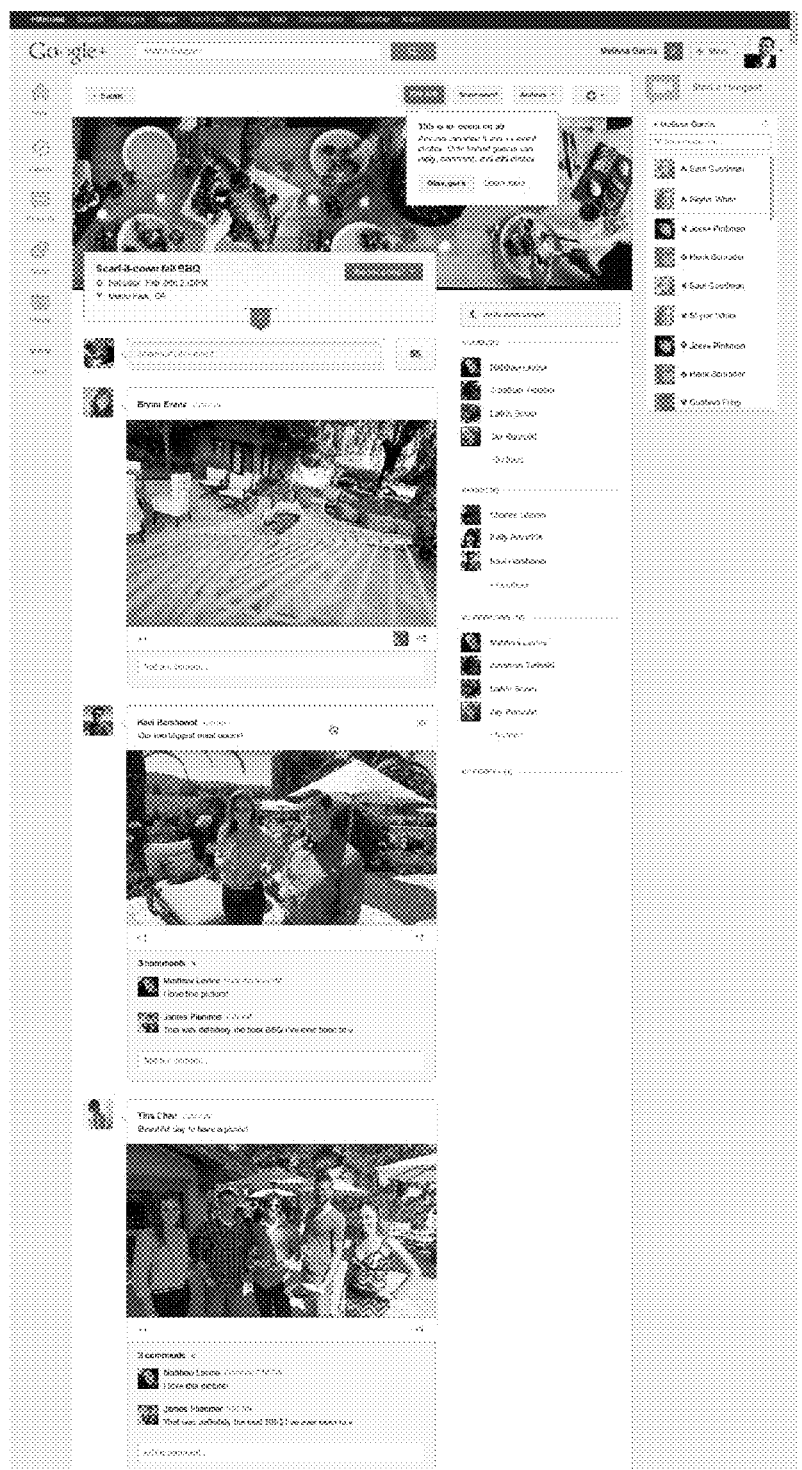
FIG. 6 is a diagrammatic view of an interface consistent with the hosting process of FIG. 1.
Figure 7:
FIG. 7 is a diagrammatic view of an interface consistent with the hosting process of FIG. 1.

Referring now to FIG. 3, hosting process 10 may include generating, using one or more computing devices, an event page 300 corresponding to a particular event. In some embodiments, the event page may be associated with a social network (e.g. Google+, etc.). The event page may be hosted by any suitable computing device such as server computing device 12 shown in FIG. 1. Event page 300 may include a description 302 of the event, in this particular example, a dinner at a Japanese restaurant. Event description 302 may include any suitable type of information, some of which may include, but is not limited to, the name of the event, the date of the event, the time of the event, the invitee list, the address of the event, photos associated with the event, event options, etc. As shown in event options window 304, hosting process 10 may provide a user with an option of creating an "on-air event", which may be viewed by any member associated with the social network. Accordingly, hosting process 10 may be configured to allow access to event page 300 to one or more members of the social network.

In some embodiments, hosting process 10 may be configured to determine a subset of the one or more members of the social network. The subset may correspond to the invitees associated with event page 300. In this way, the invitees may be provided with additional permissions regarding event page 300 that others associated with the social network do not have. For example, some permissions may include, but are not limited to, the ability to edit the event page, the ability to add photos to the event page, the ability to add comments to the event page, the ability to add videos to the event page, etc.

Accordingly, embodiments of the present disclosure may allow for public consumption of large events, while restricting participation and preventing abuse. In some embodiments, the "on-air events" may allow event invitees to continue to interact with the canonical event post (hereafter canonical post). An additional "broadcast" public event post (hereafter broadcast post) may be created when a broadcast event is created, with comments disabled. In some embodiments, invitees may do anything the event ACL allows them, including, but not limited to, RSVP, comment, add photos, invite more, etc.

Additionally and/or alternatively, any member of the social network may be permitted to add the event to his/her calendar. Additionally and/or alternatively, hosting process 10 may show an "Add to calendar button for viewers. This would treat the event like any calendar event, and send regular calendar reminders (e.g. Google Calendar). The hosting process described herein may be used in conjunction with one or more social networking applications.

Further, and as shown in FIGS. 4-7, any member of the social network may be allowed to socially annotate at least one aspect of the event page. Hosting process 10 may be further configured to provide an indication to the one or more members of the social network that the event is currently occurring or is about to occur.

In some embodiments, and as shown in FIGS. 4-7, hosting process 10 may be configured to receive real-time updates to event page 300 from the subset (e.g. invitees) of the one or more members of the social network. In the example, shown in FIGS. 4-7, event page 400 corresponds to an outdoor barbeque. Accordingly, the invitees to the particular event have posted numerous pictures and associated commentary corresponding to the event.

Additionally and/or alternatively, hosting process 10 may be configured to restrict one or more members of the social network from editing the event page (e.g. non-invitees, etc.). For example, public viewers not on the invite list may have limited access. Accordingly, in some embodiments, they may be allowed to view event details, view the event guest list, view comments (e.g., canonical comments, not from broadcast post), provide social annotations (e.g. +1) to event photos, share the event (e.g., reshare broadcast post), show "Share event" button that shares the broadcast post, use filters (e.g., filter by contributor, face, popularity, etc), view system posts (e.g., if they are pushed to their stream, e.g.: "Zach added 3 photos to EventName")—these posts may be public.

Additionally and/or alternatively, in some embodiments, hosting process 10 may be configured to prevent certain actions. Some of these may include, but are not limited to, preventing one or more users from RSVP, preventing one or more users from adding photos, preventing one or more users from adding comments to event page, preventing one or more users from commenting on event photos, preventing one or more users from inviting other attendees, etc.

Embodiments of hosting process 10 disclosed herein may be configured to provide one or more indications of "on-air" mode. Referring again to FIGS. 4-7, some examples of "on-air" indications may include, but are not limited to, on event details page, instead of "public/private event"→"On Air event" (e.g., clicking this may show an explanatory info bubble: "This event is view-only to public: anyone can view it and +1 event photos. Only invited guests can reply, comment, and add photos. The user may be provided with the option of confirming acceptance, e.g., "Okay, got it" shown in FIGS. 4-7. Some examples of indications may also include, preventing a user from seeing any buttons/text fields that correspond to actions that the particular viewer is not permitted to take. Also, hosting process 10 may be configured to show simple messages as appropriate: This event is view-only to public: anyone can view it and socially annotate photos. Only invited guests may reply, comment, and add photos. A list of which users can contribute to the event and which users are currently viewing the event may be available Embodiments of hosting process 10 disclosed herein may be configured to allow for the enabling and/or disabling of this setting. For example, hosting process 10 may include a setting in the event options menu (e.g., during event creation).

Embodiments of hosting process 10 disclosed herein may be configured for use with mobile devices such as those shown above with reference to FIG. 1. Accordingly, hosting process 10 may operate in a similar manner as discussed above.

Figure 8:
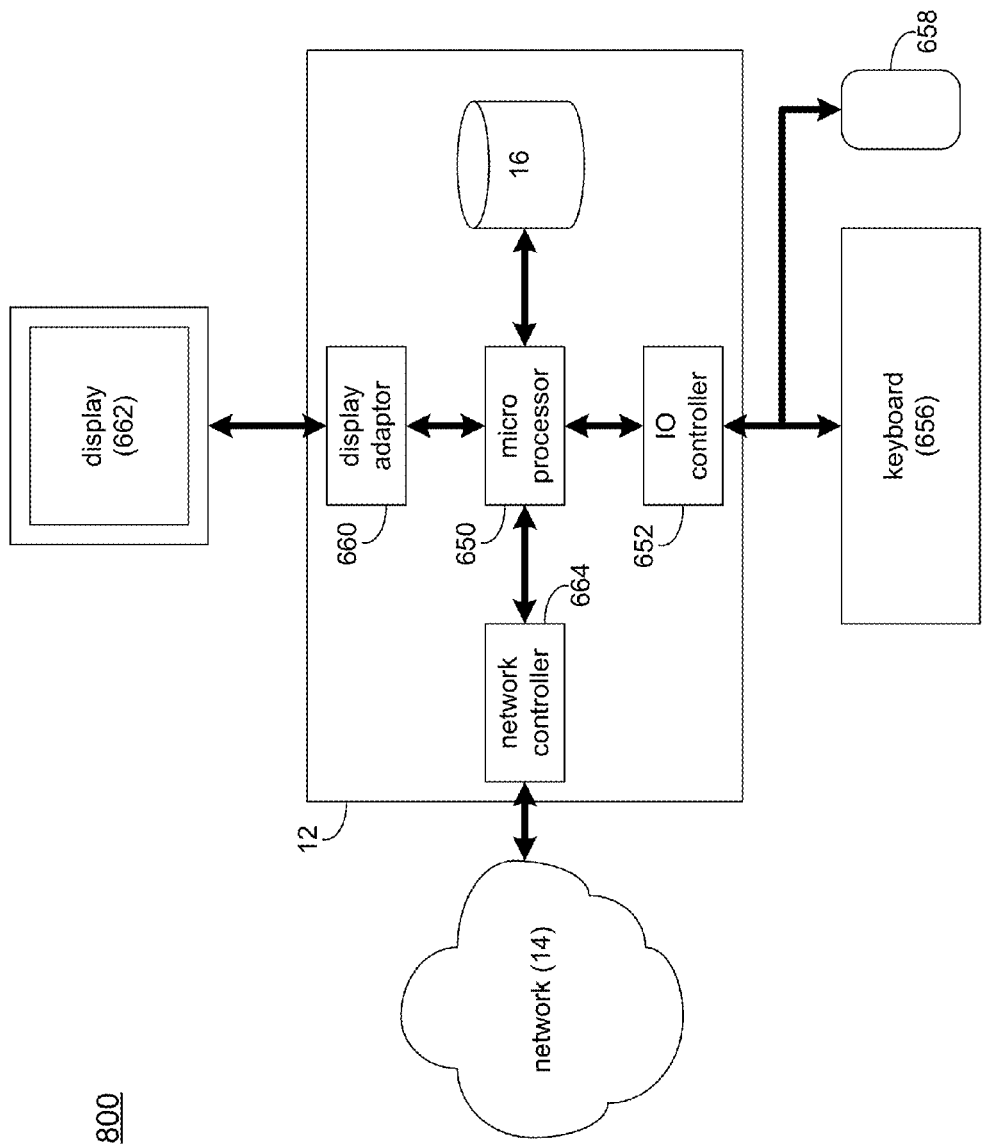
FIG. 8 is a diagrammatic view of a computing system, which may be used in accordance with the hosting process described herein.

Referring also to FIG. 8, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, image comparison process 10 may be substituted for computing device 12 within FIG. 8, examples of which may include but are not limited to client electronic devices 28, 30, 32, 34.

Computing system 12 may include microprocessor 650 configured to e.g., process data and execute instructions/code for image comparison process 10. Microprocessor 650 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 652 may be configured to couple microprocessor 650 with various devices, such as keyboard 656, mouse 658, USB ports (not shown), and printer ports (not shown). Display adaptor 660 may be configured to couple display 662 (e.g., a CRT or LCD monitor) with microprocessor 650, while network adapter 664 (e.g., an Ethernet adapter) may be configured to couple microprocessor 650 to network 14 (e.g., the Internet or a local area network).

As will be appreciated by one skilled in the art, the present disclosure may be embodied as a method (e.g., executing in whole or in part on computing device 12), a system (e.g., computing device 12), or a computer program product (e.g., encoded within storage device 16). Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium (e.g., storage device 16) having computer-usable program code embodied in the medium.

Any suitable computer usable or computer readable medium (e.g., storage device 16) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor (e.g., processor 350) of a general purpose computer/special purpose computer/other programmable data processing apparatus (e.g., computing device 12), such that the instructions, which execute via the processor (e.g., processor 200) of the computer or other programmable data processing apparatus, create means for implementing the functions/acts specified in the flowchart and/or block diagram block or blocks.

These computer program instructions may also be stored in a computer-readable memory (e.g., storage device 16) that may direct a computer (e.g., computing device 12) or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer (e.g., computing device 12) or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
generating, using one or more computing devices, an event page corresponding to a particular event, the event page associated with a social network;
allowing access to the event page to one or more members of the social network;
determining a subset of the one or more members of the social network based on a determination that an invitation associated with the event page was sent to the subset;
providing the subset of the one or more members of the social network with permission to edit the event page based on a determination of permissions according to an access control list associated with the particular event;
receiving real-time updates to the event page from the subset of the one or more members of the social network;
restricting the one or more members of the social network who are not part of the subset from editing the event page, wherein editing includes at least one of adding photos, adding videos, and adding comments to the event page;
providing the one or more members of the social network with a user interface that includes an interface element that, upon selection, adds the particular event to an electronic calendar associated with the one or more members;
responsive to receiving a request from a first member of the one or more members of the social network to add the particular event to the electronic calendar, sending an electronic calendar reminder to the first member;
providing an indication to the one or more members of the social network that the particular event is currently occurring; and
filtering the event page based on at least one of a contributor that edited the event page and a member associated with a photo that was added to the event page.

2. A computer-implemented method comprising:
generating, using one or more computing devices, an event page corresponding to a particular event, the event page associated with a social network;
allowing access to the event page to two or more members of the social network;
determining a subset of the two or more members of the social network that have permission it the event page based on a determination that an invitation associated with the event page was sent to the subset;
determining that a first member of the social network is part of the subset of the two or more members of the social network that have permission to edit the event page;
providing the first member with a first user interface that includes a first interface element that, upon selection, adds the particular event to a first electronic calendar associated with the first member and a second user interface element that provides an option to edit the event page;
determining that a second member of the social network is not part of the subset of the two or more members of the social network that have permission to edit the event page;
providing the second member with a second user interface that includes a third interface element, that, upon selection, adds the particular event to a second electronic calendar associated with the second member;
responsive to receiving a request from the first member to add the event to the electronic calendar, sending an electronic calendar reminder to the first member;
receiving real-time updates to the event page from the first member; and
providing an indication to the two or more members of the social network that the particular event is currently occurring.

3. The computer-implemented method of claim 2, wherein the generated event page is electronically accessible to the one or more members.

4. The computer-implemented method of claim 2, wherein providing includes providing the subset with permission to add comments to the event page.

5. The computer-implemented method of claim 2, wherein providing includes providing the subset with permission to add videos to the event page.

6. The computer-implemented method of claim 2, wherein providing the first member with the first user interface comprises providing an explanatory bubble that describes the permissions associated with the particular event to the first member.

7. The computer-implemented method of claim 2, further comprising:
allowing at least one of the two or more members to socially annotate at least one aspect of the event page.

8. The computer-implemented method of claim 2, wherein the invitation includes an option to RSVP to the particular event.

9. The computer-implemented method of claim 2, further comprising:
filtering the event page based on at least one of a contributor to the event page and a face in a photo associated with the particular event.

10. A computing system comprising:
one or more processors; and
a memory containing software instructions that, when executed by the one or more processors, cause the one or more processors to perform operations including:
generating an event page corresponding to a particular event, the event page associated with a social network;
allowing access to the event page to two or more members of the social network;
determining a subset of the two or more members of the social network that have permission to edit the event page based on a determination that an invitation associated with the event page was sent to the subset;
determining that a first member of the social network is part of the subset of the two or more members of the social network that have permission to edit the event page;
providing the first member with a user interface that includes a first interface element that, upon selection, adds the particular event to an electronic calendar associated with the first member and a second user interface element that provides an option to edit the event page;
determining that a second member of the social network is not part of the subset of the two or more members of the social network that have permission to edit the event page;
providing the second member with a second user interface that includes a third interface element, that, upon selection, adds the particular event to a second electronic calendar associated with the second member;
responsive to receiving a request from the first member to add the event to the electronic calendar, sending an electronic calendar reminder to the first member;
receiving real-time updates to the event page from the first member; and
providing an indication to the members of the social network that the particular event is currently occurring.

11. The computing system of claim 10, wherein the generated event page is electronically accessible to the two or more members.

12. The computing system of claim 10, wherein providing includes providing the subset with permission to add comments to the event page.

13. The computing system of claim 10, wherein providing includes providing the subset with permission to add videos to the event page.

14. The computing system of claim 10, wherein providing the first member with the first user interface comprises providing an explanatory bubble that describes the permissions associated with the particular event to the first member.

15. The computing system of claim 10, wherein the operations further include:
allowing at least one of the two or more members to socially annotate at least one aspect of the event page.

16. The computing system of claim 10, wherein the invitation includes an option to RSVP to the particular event.

17. The computing system of claim 10, wherein the permissions are determined based on an access control list associated with the particular event.

18. A computer program product including a non-transitory computer-readable storage medium having stored thereon instructions, which when executed by a processor result in one or more operations comprising:
generating an event page corresponding to a particular event, the event page associated with a social network;
allowing access to the event page to two or more members of the social network;
determining a subset of the two or more members of the social network based on an access control list associated with the event page and stored in a database hosted by a computing device that includes the processor;
determining that a first member of the social network is part of the subset of the two or more members of the social network that have permission to edit the event page;
providing the first member with a first user interface that includes a first interface element that, upon selection, adds the particular event to a first electronic calendar associated with the first member and a second user interface element that provides an option to edit the event page;
determining that a second member of the one or more members of the social network is not part of the subset of the two or more members of the social network that have permission to edit the event page;
providing the second member with a second user interface that includes a third interface element, that, upon selection, adds the particular event to a second electronic calendar associated with the second member;
receiving real-time updates to the event page from the first member; and
providing an indication to the members of the social network that the particular event is currently occurring.

19. The computer program product of claim 18, further comprising:
filtering the event page based on at least one of a contributor to the event page and a face in a photo associated with the particular event.

20. The computer program product of claim 18, wherein the generated event page is electronically accessible to the two or more members.

* * * * *